United States Patent [19]  [11] 4,166,606
Kawolics et al.  [45] Sep. 4, 1979

[54] FLOATING SEAL FOR FLUID CONTROL DEVICES

[75] Inventors: Raymond P. Kawolics, Solon; Donald R. Basel, Garfield Heights; Frans L. Adeboi, Berea, all of Ohio

[73] Assignee: The Meyer Dairy Products Company, Cleveland, Ohio

[21] Appl. No.: 740,500

[22] Filed: Nov. 10, 1976

[51] Int. Cl.² .............................................. F16k 31/60
[52] U.S. Cl. .................................. 251/214; 251/331; 251/335 A; 277/58
[58] Field of Search ............... 251/214, 330, 331, 333, 251/335 A, DIG. 1, 335 B; 277/58, 237 R, 1, 9, 59

[56] References Cited
U.S. PATENT DOCUMENTS

| 2,727,797 | 11/1955 | Snyder | 277/58 |
| 3,094,145 | 6/1963 | Chernak et al. | 251/331 |
| 3,104,089 | 9/1963 | Seltsam | 251/331 |
| 3,301,525 | 1/1967 | Chernak et al. | 251/331 |
| 3,375,016 | 3/1968 | Jellinek et al. | 277/58 |
| 3,510,155 | 5/1970 | Jacobus | 277/58 |
| 3,514,114 | 5/1970 | Monahan | 277/9 |
| 3,735,957 | 5/1973 | Duggar, Jr. | 251/330 |
| 3,904,174 | 9/1975 | Giese | 251/331 |

Primary Examiner—William R. Cline
Assistant Examiner—G. L. Walton
Attorney, Agent, or Firm—Fay & Sharpe

[57] ABSTRACT

A floating secondary stem seal arrangement for fluid control devices which becomes operative only when fluid by-passes the primary stem seal. A secondary stem seal member is disposed outwardly along the stem from the primary seal in a secondary seal member receiving chamber. The cooperative configuration of the chamber, the secondary seal member and the stem is such that under normal operating conditions with no fluid by-passing the primary seal, the secondary seal will not perform any sealing function against the stem. Fluid by-passing the primary seal moves the secondary seal member within the secondary seal chamber axially of the stem and into a forced sealing position therewith. This selective operation of the secondary seal assures that it will be essentially free from wear during normal operating conditions and, therefore, effective for sealing purposes in the event of primary seal failure.

14 Claims, 8 Drawing Figures

FLOATING SEAL FOR FLUID CONTROL DEVICES

BACKGROUND OF THE INVENTION

This invention pertains to the art of fluid control devices and more particularly to sealing means for such devices.

The invention is particularly applicable to a secondary seal arrangement for fluid control devices which control fluid flow from beverage dispensers, coffee urns and the like and will be described with particular reference thereto. However, it will be readily appreciated by those skilled in the art that the invention has broader application and has utility in many other environments.

Fluid control devices or faucets to which the subject invention is particularly directed utilize a stem member which is selectively reciprocable to move a valving member into and out of engagement with a sealing seat area for purposes of controlling fluid flow. In such devices, a primary stem packing or seal arrangement is employed for preventing undesired fluid flow outwardly of the device around the stem. Such stem packing or seals have taken many and varied forms and configurations in an effort to prevent such leakage. However, and regardless of these forms and design characteristics, the stem packings or seals eventually become ineffective or fail entirely due to the wearing effect of repetitive reciprocations of the stem in controlling fluid flow. When stem packing or seal failure occurs, fluid passing through the fluid control device or faucet is permitted to seep by or by-pass the stem seal resulting in valve leakage. When this situation occurs, it is necessary to disassemble the control device in order to replace the seal. In the event that the fluid control device is not continuously monitored, stem seal leakage can cause significant direct losses in system fluids, cause unnecessary housekeeping problems and possibly cause damage to equipment, materials and the like. The problem of stem seal wear and leakage generally increases as the pressure of the fluid being controlled increases.

To alleviate these problems, there have been some prior attempts to provide secondary stem seals or packings which would assume the necessary and appropriate stem sealing function in the event of primary stem seal failure. However, these attempts have not proved particularly successful because of the basic design concepts utilized. More particularly, prior secondary or backup seals have employed design characteristics substantially similar to the primary seals so that they were, in effect, continuously operative along with the primary seals. Thus, as the primary seals were worn due to continuous operative contact with the associated stems, the secondary or backup seals were similarly worn. Accordingly, when the primary seals failed and the secondary or backup seals were required to perform the stem sealing function, the secondary seals themselves had reached or were reaching the point of failure, having been subjected essentially to the same wear as the primary seals. In fact, in some prior secondary or backup seal designs, the secondary seals failed prior to failure of the primary seals.

For these reasons, it has been desired to develop a secondary or backup stem seal or packing arrangement which would not be subjected to significant wear until system fluid by-passed the primary seal or packing. This type of arrangement or system would then preserve the secondary or backup seal effectiveness for use only when and as necessary.

The present invention contemplates a new and improved structural arrangement which overcomes the foregoing problems and others and which provides a secondary seal or packing arrangement which is simple in design, economical to employ, performs a stem sealing function only when and as needed in response to a breakdown of the primary sealing arrangement and which is readily adapted for use in a number of different fluid control devices and environments.

BRIEF DESCRIPTION OF THE PRESENT INVENTION

In accordance with the present invention, there is provided a new and improved secondary stem seal means for use in a fluid control device of the type having a stem member which is selectively reciprocable relative to a seat area for controlling fluid flow through the device and wherein the device includes primary stem seal means. The secondary stem seal means is disposed outwardly of the stem from the primary stem seal means and is movable between a first or normally non-sealing and a second sealing condition with the stem in response to fluid by-passing the primary seal means.

In accordance with another aspect of the present invention, the secondary seal means comprises a seal member surrounding the stem and disposed in an annular seal receiving chamber surrounding an axial portion of the stem. The chamber has inner and outer walls defining a chamber main portion with the inner wall thereof defined by the stem. At least one of the chamber inner and outer walls tapers inwardly toward the other adjacent at least the outermost end of the chamber so as to define a chamber sealing portion. In the first or normal position, the secondary seal member is disposed in the chamber main portion in a non-sealing relationship with the stem and is driven axially through the chamber toward the chamber sealing portion into a sealing relationship with the stem in response to primary seal means leakage or failure.

In accordance with a more specific aspect of the present invention, the seal member comprises a resilient seal ring dimensioned such that fluid by-passing the primary seal will deform the seal ring into a sealing condition with the stem and the chamber as the fluid moves the seal ring into the chamber sealing portion.

In accordance with a further more specific aspect of the present invention, the secondary seal arrangement is particularly adapted for use in a liquid control device of the type having a faucet body including a first passageway communicating between an inlet and an outlet and a faucet assembly including an elongated stem member selectively reciprocable within the faucet body for controlling liquid flow through the faucet.

The principal object of the present invention is the provision of a new and improved secondary seal arrangement for fluid control devices.

Another object of the present invention is the provision of a new and improved secondary seal arrangement for fluid control devices which is simple in design and inexpensive to implement into use.

Still another object of the present invention is the provision of a new and improved secondary seal arrangement for fluid control devices wherein the seal is activated to perform a sealing function only when the primary seal has become ineffective or failed.

Still a further object of the present invention is the provision of a new and improved secondary seal arrangement for fluid control devices which may be readily adapted to use in any number of different devices and environments.

BRIEF DESCRIPTION OF THE DRAWINGS

The invention may take physical form in certain parts and arrangements of parts, preferred embodiments of which will be described in detail in the specification and illustrated in the accompanying drawings which form a part hereof and wherein.

DESCRIPTION OF THE PREFERRED EMBODIMENT

Figure 1:
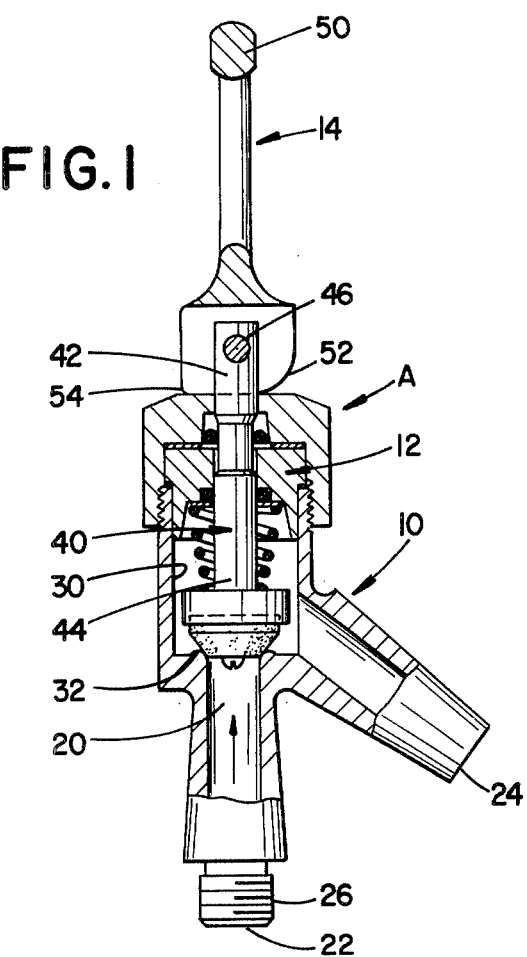
FIG. 1 is a cross-sectional view showing a typical fluid control faucet into which the subject invention has been incorporated with the faucet being in a closed position.

Referring now to the drawings wherein the showings are for purposes of illustrating preferred embodiments of the invention only and not for purposes of limiting same, FIGS. 1-5 show a fluid control device or faucet A generally comprised of a body portion 10, a stem assembly 12 and a handle 14.

More particularly, body portion 10 includes a first passageway 20 interconnecting spaced apart inlet and outlet ends 22,24. A threaded area 26 is conveniently included adjacent inlet end 22 to facilitate mounting of the control device to a fluid line, beverage dispenser or the like. This threaded area or some other convenient mounting may be modified as may be necessary and/or desirable for a particular application. Communicating with first passageway 20 is an enlarged second passageway generally designated 30. A sealing seat area 32 is conveniently included along the first passageway in order that a valving member associated with stem assembly 12 may be selectively moved into and out of sealing engagement therewith. The specific design details for the faucet shown in FIGS. 1-5 do not, themselves, form a specific part of the present invention. It should be noted, therefore, that the specific structural details of the faucet may take many alternative forms and be constructed from many alternative materials. However, in a typical beverage dispenser environment, body portion 10 may be conveniently manufactured from plastic, brass or the like as may be necessary and/or desirable.

Stem assembly 12 extends longitudinally through passageway 30 and includes an elongated stem member 40. Stem member 40 has an upper end 42 spaced outwardly of the second passageway and a lower end 44 disposed within that passageway. A pivot pin generally designated 46 is employed for mounting handle 14 to the stem member adjacent upper end 42 to allow arcuate or pivotal movement thereabout for reciprocating the stem assembly 12.

Figure 2:
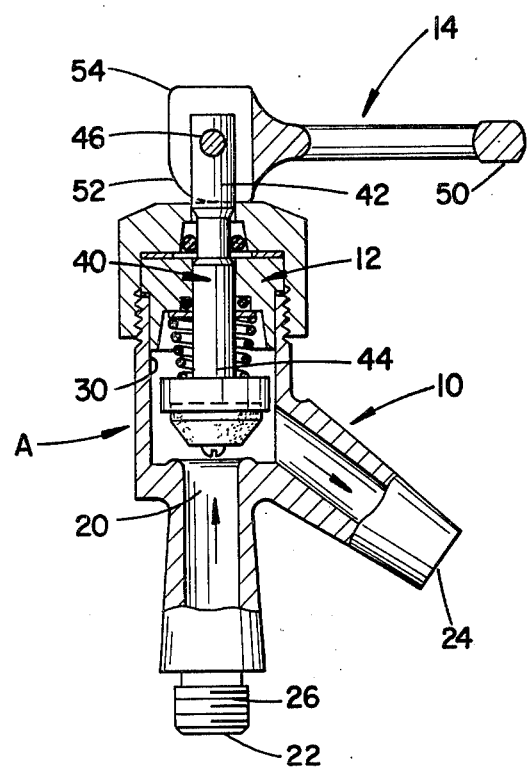
FIG. 2 is a view similar to FIG. 1 with the faucet in an opened position.

In this respect, handle 14 includes a gripping portion 50 adjacent the uppermost end thereof and cam surfaces 52,54 at the lower end. As pressure is applied in one direction or another against gripping portion 50, the handle may be moved about either of cam surfaces 52,54 in order to obtain movement of stem assembly 12 within the faucet body. This type of structure and operation is known in the art and is best shown in FIGS. 1 and 2. As the particular desig for handle 14 does not form a specific part of the present invention, a further detailed description thereof is deemed unnecessary.

Figure 3:
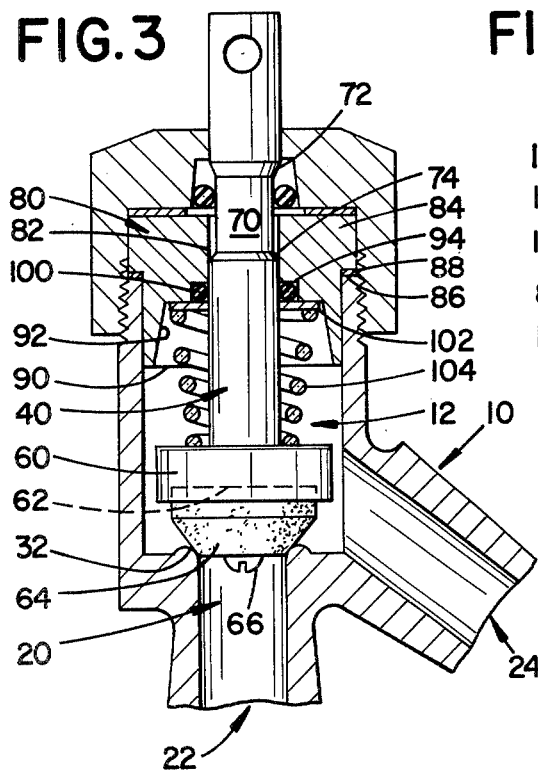
FIG. 3 is an enlarged view of a portion of FIG. 1 more particularly showing the invention of the subject application.

With particular reference to FIG. 3, elongated generally cylindrical stem member 40 is shown as including an outwardly extending flanged area 60 adjacent lower end 44. Area 60 includes a recessed area 62 in the outermost end or face thereof adapted to receive closely a bevelled seat washer 64. This seat washer may be conveniently mounted within recessed area 62 by threaded fastener means 66. While bevelled seat washer 64 could be constructed from a number of materials, a resilient material is normally employed for obtaining the desired cooperative sealing relationship with seat area 32.

Figure 4:
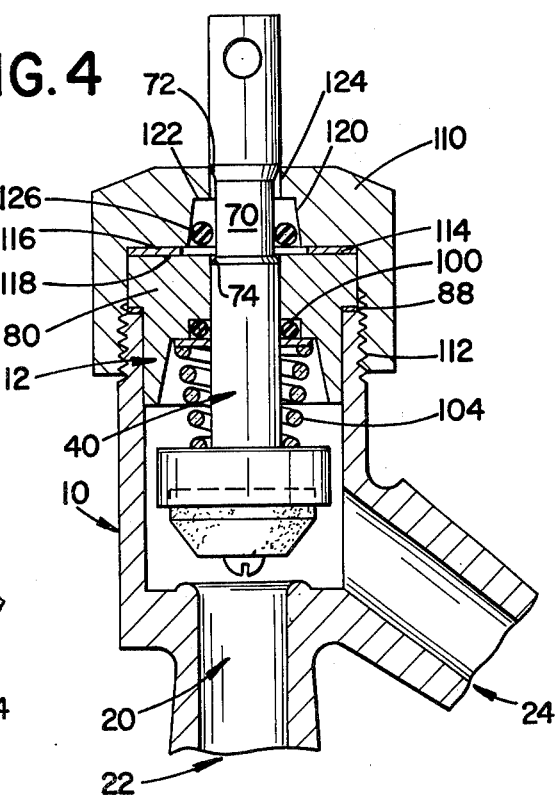
FIG. 4 is an enlarged view of a portion of FIG. 2 more particularly showing the present invention.

As best shown in FIGS. 3 and 4, elongated stem member 40 includes an area 70 of reduced diameter extending axially over a portion of the length thereof. Interconnecting this area of reduced diameter with the remaining portion of the stem is a tapered upper area 72 and a tapered lower area 74. The inclusion of tapered area 72 is considered to be particularly advantageous in obtaining the desired sealing result as will be described in greater detail hereinafter.

A stem guide member generally designated 80 is received in a portion of second passageway 30 from the outermost end thereof. Stem guide 80 includes a central opening 82 dimensioned to closely slidably receive elongated stem member 40. A flanged area 84 disposed adjacent the uppermost end of the guide cooperates with the upper or outer end 86 of second passageway 30 and an annular sealing washer 88 is conveniently received therebetween. Lower end 90 of the stem guide includes an enlarged inwardly extending and tapering frusto-conical recess area 92 and a smaller, generally cylindrical recess 94 extending inwardly from the end wall of recess 92. Recess 94 is dimensioned relative to stem member 40 to receive a primary stem seal means.

The primary stem seal 100 is received in recess 94 in positive sealing engagement with the stem member 40. In the preferred arrangement here under discussion and as generally shown in the FIGURES, primary stem seal 100 is comprised of a O-ring seal constructed from rubber or the like. Many other types and styles of primary seals or packings may also be employed. A flat annular washer member 102 received against the bottom wall of frusto-conical recess 92 retains primary seal 100 in recess 94.

Moreover, a stem spring 104 has one end thereof received against washer member 102 and the other end operating against stem member flanged area 60. While a tapered stem spring 104 is shown in the drawings, this spring configuration could be of many other designs. The purpose of the spring is to urge continuously the stem assembly toward engagement with seat area 32 in order to prevent fluid flow through the faucet. The spring pressure exerted may, of course, be overcome by appling a force against handle gripping portion 50 as is known.

During reciprocation of stem member 40 within second passageway 30, the outer peripheral stem surface is positively engaged by primary stem seal 100 and thus rubs or abraids against the seal during stem reciprocation. In a typical situation where the faucet is used on beverage dispensing apparatus such as a coffee maker, the number of individual stem reciprocations will be quite high. Since the primary stem seal remains stationary in cylindrical recess 94, repetitive reciprocation of stem member 40 therepast in positive contact therewith has the effect of abraiding the stem seal inner diameter. This causes seal wear and an eventual resultant increase in the internal diameter thereof. As a result, the effectiveness of the primary stem seal is decreased over a period of time until it either fails entirely or no longer seals properly. In that event, fluid entering second passageway 30 as it flows through passageway 20 from inlet 22 toward outlet 24 is also permitted to pass between primary stem seal 100 and elongated stem member 40 and thence outwardly of the faucet body. Such fluid leakage is obviously undesirable.

Figure 5:
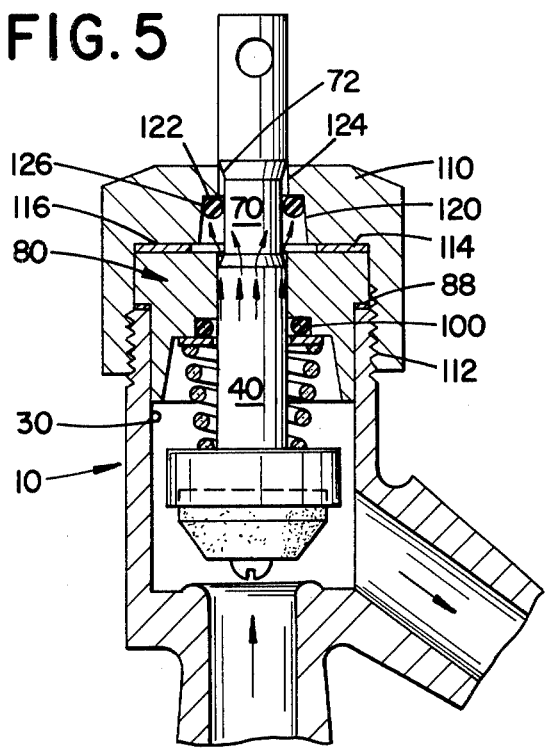
FIG. 5 is a view similar to FIG. 4 schematically showing failure of the primary seal with the secondary seal moved to a sealing position.

In accordance with the present invention, a new secondary seal arrangement is provided which becomes operative only in the event of primary seal failure, and which until that time is not subjected to significant wear. With particular reference to FIGS. 4 and 5 which show the valve assembly in an opened condition for allowing fluid flow through the first passageway between the inlet and outlet, the secondary seal arrangement is disposed in bonnet nut 110. The bonnet nut arrangement is conventional for faucets of this general type and simply acts to close the uppermost end of second passageway 30. The bonnet nut is threadedly received on the outermost end of the faucet body at threaded area 112. An annular washer 114 is disposed between bonnet nut bottom wall 116 and stem guide top wall or face 118. Threaded advancement of bonnet nut 110 onto threaded area 112 thus assures that bonnet nut 110, washer 114, stem guide 80 and washer 88 are disposed in a fluid tight relationship on valve body 10.

Extending inwardly from bonnet nut bottom wall 116 is a frusto-conical opening generally designated 120 tapering inwardly to an end wall 122. Extending the remainder of the bonnet nut from end wall 122 is a cylindrical opening 124 which closely surrounds the uppermost end of the elongated stem member. As best shown in FIGS. 3–5, frusto-conical opening 120, end wall 122, washer 114 and reduced diameter area 70 of the elongated stem member act in combination to define a secondary seal member chamber. An annular seal member 126 is received in this chamber and, in the preferred embodiment here under discussion, comprises an O-ring member. The dimensional characteristics between this O-ring member and the secondary seal chamber are particularly important in practicing the concepts of this invention so that the secondary seal will not become sealingly operative or be materially abraided unless and/or until primary seal member 100 has begun to leak or has entirely failed.

FIGS. 3 and 4 show the faucet structure in closed and opened positions with the primary seal member 100 in a fully operative or sealing condition with stem 40. Secondary seal ring member 126 is dimensioned such that in this condition of the primary seal, the secondary seal will merely rest at the bottom of the secondary seal chamber adjacent washer 114 in a fairly closely spaced but non-sealing relationship with reduced diameter area 70 of the stem. As a result of this structural arrangement, reciprocation of the stem for moving the valve assembly between opened and closed conditions will not abraid or wear secondary seal member 126. Accordingly, the secondary seal will remain fresh or undamaged until such time as it is needed because of primary seal failure.

Such failure is schematically shown in FIG. 5. Primary seal member 100 is there shown in an exaggerated manner as having become worn, i.e., as possessing an enlarged internal diameter, so that it no longer sealingly engages stem member 40. As a result, when the stem assembly is moved to an opened condition to facilitate fluid flow through the faucet, some fluid will by-pass the primary seal and pass upwardly along the stem between the stem and stem guide. This operative situation is shown by the small arrows in FIG. 5. In prior designs, this fluid would then simply pass outwardly of the valve through the bonnet.

However, in using the concepts of the subject invention, the force of the fluid by-passing the primary seal and passing upwardly along the stem will urge secondary seal member 126 upwardly from its normal position adjacent washer 114 toward the uppermost portion of the secondary seal chamber. Because of the tapered or frusto-conical configuration of recess area 120, as the secondary seal is forced upwardly by fluid pressure, the tapered side wall of the recessed area acts to compress or move the secondary seal into positive sealing engagement with the walls of the seal chamber and with the stem member along reduced diameter area 70 thereof.

When the valve assembly is moved from the opened position as shown in FIG. 5 to a closed position such as shown in FIG. 3, fluid flow through the faucet will be discontinued so that the pressure urging secondary seal member 126 upwardly into a sealing condition with the stem will be relaxed and/or released. Upon reopening of the faucet, fluid pressure will again be applied to activate the secondary seal. Because of the movement of the secondary seal member between a non-engaging or non-sealing position and an engaging or sealing position with the stem member in response to flow by-passing the primary seal, some small amount of fluid may escape past the secondary seal and outwardly of the faucet body at the bonnet as the secondary seal member is being moved from its initial or non-engaging position to the second or sealing position. The amount of liquid so escaping will be rather small and will act as an indicator to users or operators of the faucet that the primary seal has failed or is malfunctioning.

The primary and secondary seal members 100, 126 are, in the preferred embodiment, comprised of rubber O-ring seals. However, other types of sealing members, such as quad rings for example, could also be advantageously employed without in any way departing from the intent or scope of the present invention. Further, modifications may also be made to the secondary sealing chamber arrangement as well as its specific location with regard to the overall faucet structure without departing from the intent or scope of the invention. Similarly, the precise type and configuration of the faucet A is not critical to acceptable operation of the essential concepts herein disclosed and the inventive concepts may be readily adapted to other types of fluid control devices as will become apparent hereinafter.

Figure 6:
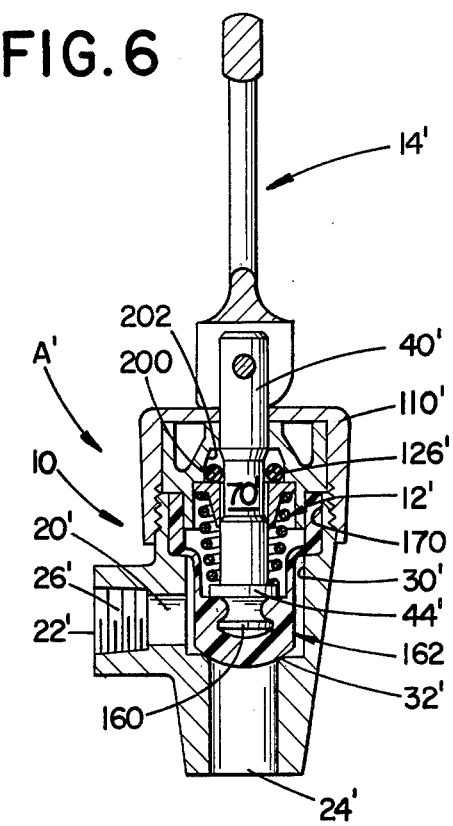
FIG. 6 is a view similar to FIG. 1 showing use of the invention in a modified faucet design.
Figure 7:
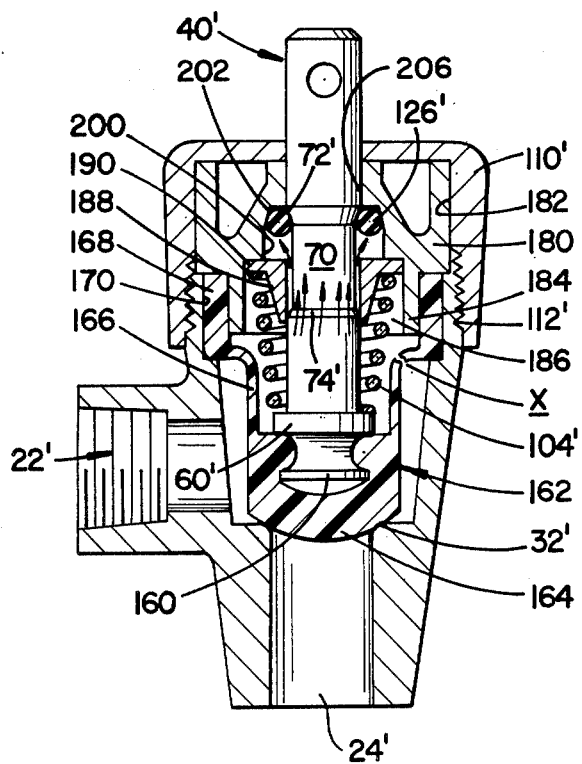
FIG. 7 is a view schematically showing primary seal failure of the faucet of FIG. 6 when it is in a closed position and the secondary seal moved to a sealing position; and, FIG. 8 is a view similar to FIG. 7 with the faucet in an opened position.
Figure 8:
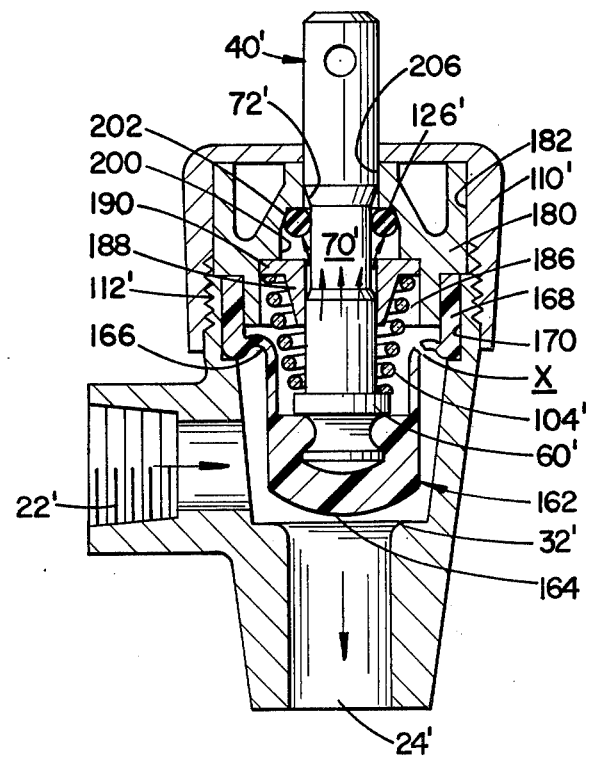

FIGS. 6–8 show use of the subject inventive concepts as applied to a different type of fluid control faucet and demonstrates the versatility of the invention. For ease of understanding and appreciating the modified form and use of the invention, like components are identified by like numerals with the inclusion of a primed (') suffix and new components are identified by new numerals. The principal difference in this modified arrangement is the replacement of the primary stem seal structure as specifically described hereinabove with a seat cup type valving member which simultaneously functions to control fluid flow through the faucet and as the primary seal.

In FIGS. 6–8, stem member 40' includes a bulbous protrusion 160 at the innermost end thereof. This protrusion is adapted to be lockingly received in a receiving opening included in a flexible seat cup member generally designated 162. This seat cup includes a lower end wall 164 adapted to be placed into and withdrawn from sealing engagement with sealing seat area 32'. Extending upwardly from lower end wall 164 is a continuous upstanding resilient tubular side wall 166 which, in turn, merges into an enlarged continuous upstanding tubular base 168. Seat cup 162 is preferably manufactured from silicone rubber, although other resilient materials could also be advantageously employed. When disposed in second passageway 30', the outer surface of tubular base 168 engages the inner surface of a slightly enlarged area 170 of bore 30' which is disposed adjacent the open upper end thereof.

Also received in this open upper end is an expander member generally designated 180. The expander includes an outer side wall 182 which is closely received in cup-shaped bonnet member 110'. Protruding axially outward from the lowermost end of the expander is an axial flange 184 which is closely received against the inside of tubular base 168 when the bonnet nut is threadedly mounted to faucet body 10' by means of threads 112'. Seat cup member 162 is thus firmly retained in position within second passageway 30'.

Expander member 180 includes a central opening passing therethrough to accommodate stem 40'. Included as part of this opening is an enlarged portion 186 disposed on the inside of flange 184 and which receives a secondary seal retainer 188. This retainer is dimensioned to be slidably received over stem 40' and includes an outwardly extending flange 190 closely received in enlarged portion 186 at the inner end wall thereof. Stem spring member 104' is interposed between flange 190 and flanged area 60' on stem 40' for continuously urging end 164 of the seat cup toward engagement with the area 32'.

Extending inwardly from enlarged portion 186 is a secondary seal chamber defined by a cylindrical wall portion 200 and a frusto-conical walled portion 202. Secondary seal member 126' is then received in this chamber and confined therein by retainer 188 and the upper wall of the chamber itself. The upper end of the stem is passed through a smaller diameter opening 206 adjacent the outermost end of the expander.

In the arrangement described above and shown in FIG. 6 with the faucet operating under normal conditions with no leakage through or past seat cup 162, secondary seal member 126' is disposed at the bottom of the secondary seal chamber adjacent retainer 188. The inside diameter of secondary seal member 126' is slightly larger than reduced diameter area 170' so that during normal valve operation there is no sealing contact therebetween. Such contact would otherwise cause wear to the secondary seal member prior to the time that seal was actually required. As noted above, and when the seat cup type arrangement of FIG. 6 is employed, the seat cup itself acts as the primary stem seal. Thus, the only time that secondary seal member 126' would become operative is in the event that a tear or hole appears in the seat cup itself. Normally, due to the substantial number of flextures involved generally at the area of interconnection between tubular side wall 166 and tubular base 168, any fault or tear occurs generally at that zone.

Accordingly, for purposes of showing secondary seal operation, FIGS. 7 and 8 both illustrates a defect x in side wall 166 which allows fluid passing into second passage 30' from inlet 22' to flow upwardly through the faucet along stem member 140'. This flow is designated by small arrows in these FIGURES. As the fluid enters the secondary seal chamber, secondary seal member 126' is forced upwardly by the fluid flow from its normal position as shown in FIG. 6 to a position in the uppermost area of the chamber as shown in both FIGS. 7 and 8. The disposition of the components in FIG. 7 shows the faucet in a closed position and the disposition of the components in FIG. 8 shows the faucet in an opened position.

In FIG. 7, as the secondary seal is forced upwardly through the secondary seal chamber generally axially of the stem, it engages frusto-conical portion 202 and stem tapered area 72'. This engagement causes the secondary seal to be compressed into a sealing relationship with the stem and the walls of the secondary seal chamber so as to prevent fluid flow therepast and outwardly of the faucet. Because chamber 30' communicates directly with inlet area 22' of first passage 20', a tear or imperfection x in the seat cup will continuously permit fluid to communicate with the secondary seal chamber and secondary seal member 126' to force the seal member into sealing engagement with the stem.

As the valve assembly is moved from the closed position shown in FIG. 7 to the opened position shown in FIG. 8, there may be a slight release of liquid outwardly from the valve at the top of the bonnet, again, indicating to operators thereof that there is some malfunction inside the faucet. Moreover, depending somewhat upon fluid pressure and with liquid filling the inside of the seat cup due to the break or tear x, it may be impossible to move the valve assembly to the position shown in FIG. 8 without withdrawing bulbous protrusion 160 from its association with end wall 164 of the seat cup 162. In that event, the valve would remain closed so that movement of the handle without obtaining corresponding flow through the faucet outlet would act as a further indication of a malfunction to operators.

Again, the secondary seal arrangement shown with reference to FIGS. 6–8 is such that it becomes operative only in the event there is failure of the primary seal. This arrangement is particularly useful and advantageous in that the secondary seal will not be worn or abraded during normal use when it is not required for stem sealing thereby preserving it as an effective backup seal. Prior devices which have attempted to provide secondary seals have merely included extra or additional seal means normally disposed in operative sealing condition with the stem in much the same manner as the primary seal or packing means. Thus, they became worn and/or failed at approximately the same time as the primary seal. As a result, prior so-called secondary seal arrangements have not been designed to perform a secondary sealing function when they were most needed.

It should also be again observed that the specifics of the two valve structures shown with regard to FIGS. 1–5 and FIGS. 6–8 are merely exemplary of fluid control devices and environments to which the concepts of the subject invention may be applied. For example, the positions of the faucet body inlet and outlet may be reversed from that shown in the FIGURES. In the FIGS. 1–5 embodiment, such reversal would mean that fluid would flow into passageway 30 above, flanged area 60 and beveled seat washer 64 in a manner tending to force these components toward seat area 32. In the FIGS. 6–8 embodiment, such reversal would mean that fluid would tend to unseat lower end wall 164 from sealing engagement with seat area 32'. Other structural changes could also be made to the fluid control devices without in any way departing from the intent or scope of the subject invention. Moreover, while the secondary seal members 126, 126' shown and described comprise O-ring type seal members, it is also possible to utilize other types and configurations of seal members and packing systems. The primary focus of the invention is to provide secondary stem sealing means which are not subjected to appreciable wear during normal operating conditions.

The invention has been described with reference to the preferred embodiments. Obviously, modifications and alterations will occur to others upon the reading and understanding of this specification. It is out intention to include all such modifications and alterations insofar as they come within the scope of the appended claims or the equivalents thereof.

Having thus described our invention, we now claim:

1. A fluid flow control faucet comprising:
 a faucet body having a first passageway communicating between a fluid inlet and a fluid outlet with said first passageway including a sealing seat area disposed therein intermediate said inlet and outlet, said body further including an open ended second passageway communicating with said first passageway on the other side thereof from said sealing seat area;
 a stem assembly disposed in said second passageway for controlling liquid flow through said faucet body between said inlet and outlet, said stem assembly including an elongated stem member having inner and outer ends with valving means at the inner end thereof for selective engagement with said sealing seat area and means disposed at the outer end thereof for selectively reciprocating said stem member within said second passageway for moving said valving means between a first position engaging said sealing seat area for blocking fluid flow between said inlet and outlet and a second position spaced from said sealing seat area for allowing liquid flow between said inlet and outlet;
 a bonnet covering the open end of said second passageway and closely surrounding that portion of said elongated stem member extending therethrough;
 primary stem seal means for preventing fluid flow past said stem member in said second passageway and outward of said faucet at said bonnet; and,
 secondary stem seal means spaced from said primary seal means toward said bonnet, said secondary stem seal means being axially movable relative to and independently of said stem member between a normal non-sealing condition with said stem member and a sealing condition with said stem member only upon failure of said primary seal means and then being so movable into said sealing condition solely in response to the pressure of fluid by-passing said primary seal means.

2. The faucet as defined in claim 1 wherein said secondary stem seal means comprises a seal member received in a seal receiving chamber surrounding an axial portion of said stem member, said first and second conditions occurring at axially spaced apart areas in said chamber.

3. The faucet as defined in claim 2 wherein said chamber includes inner and outer walls with at least a portion of said outer wall tapering inwardly toward the inner wall adjacent the uppermost end thereof, the lowermost portion of said chamber defining a chamber main area and the uppermost portion of said chamber including said tapered portion adjacent said uppermost end defining a chamber sealing area, said seal member being disposed in said chamber main area when in said first position and in said chamber sealing area when in said second position.

4. The faucet as defined in claim 3 wherein said seal member comprises a resilient seal ring, said seal ring being dimensioned such that fluid by-passing said primary seal will deform said seal ring into said sealing condition with said stem member when said seal ring has been moved into said second position in said chamber sealing area in response to fluid by-pass flow.

5. The faucet as defined in claim 3 wherein an axial portion of said stem member defines said inner wall of said chamber.

6. The faucet as defined in claim 2 wherein said chamber has inner and outer walls defining a chamber main area adjacent the lower end thereof and a chamber sealing area adjacent the upper end thereof with at least one of said chamber inner and outer walls tapering toward the other of said walls at least in said chamber sealing area, said seal member having a first normal position disposed in said chamber main area in a non-sealing relationship with said stem member and being driven axially through said chamber toward said chamber sealing area into a second position in a sealing relationship with said stem member in response to fluid by-passing said primary seal means and acting against said seal member.

7. The faucet as defined in claim 6 wherein said chamber inner wall is defined by said stem member with that portion of said stem member defining said chamber inner wall having a smaller cross-sectional dimension than those portions of said stem member axially adjacent thereto, said smaller diameter portion having a outwardly tapering area at the uppermost area thereof.

8. The faucet as defined in claim 7 wherein the said chamber outer wall tapers inwardly toward said stem adjacent the uppermost end thereof.

9. The faucet as defined in claim 6 wherein said chamber outer wall is defined by an area in said bonnet.

10. The faucet as defined in claim 6 wherein said chamber outer wall is defined by a separate member received in said second passageway.

11. The faucet as defined in claim 6 wherein said seal member comprises a resilient seal ring dimensioned such that fluid by-passing said primary seal deforms said seal ring into said sealing relationship when said seal ring has been moved to said chamber sealing area in response to fluid by-pass flow.

12. In a fluid faucet of the type having a faucet body including a first passageway communicating between an inlet and an outlet, a stem assembly having an elongated stem member and being selectively movable by external means through a second passageway in said faucet body into and out of engagement with a sealing seat area for controlling fluid flow through said faucet and wherein said stem assembly includes primary stem seal means to prevent liquid flow past said stem member and outwardly of said faucet body through said second passageway, the improvement comprising:

secondary stem seal means disposed intermediate said primary seal means and the outermost end of said second passageway, said secondary stem seal means being movable between a normal non-sealing condition with said stem member and a sealing condition with said stem member only upon failure of said primary seal means and then being so movable into said sealing condition solely in response to the pressure of fluid by-passing said primary seal means.

13. The improvement as defined in claim 12 wherein said secondary seal means comprises a seal member surrounding said stem and disposed in a generally annular seal receiving chamber surrounding an axial portion of said stem member.

14. Secondary stem member seal means for a fluid control device of the type having a stem member which is selectively reciprocal by external means for controlling fluid flow through the device and having primary stem member seal means, said secondary stem seal means disposed outwardly of said stem member from said primary stem seal means, said secondary stem seal being movable between a normally non-sealing condition with said stem member and a sealing condition with said stem member only upon failure of said primary seal means and then being so movable into said sealing condition solely in response to the pressure of fluid by-passing said primary seal means.

* * * * *